(12) United States Patent
Heaton

(10) Patent No.: US 6,535,356 B1
(45) Date of Patent: Mar. 18, 2003

(54) HEAD LIFTER AND METHOD OF OPERATION

(75) Inventor: Mark W. Heaton, Irving, TX (US)

(73) Assignee: Texas Instruments Incorporated, Dallas, TX (US)

(*) Notice: Subject to any disclaimer, the term of this patent is extended or adjusted under 35 U.S.C. 154(b) by 865 days.

(21) Appl. No.: 09/173,497

(22) Filed: Oct. 15, 1998

Related U.S. Application Data

(63) Continuation of application No. 08/889,124, filed on Jul. 7, 1997, now abandoned.

(51) Int. Cl.[7] .................................................. G11B 5/54
(52) U.S. Cl. ...................................... 360/250; 360/294.7
(58) Field of Search ................................. 360/104, 105, 360/106, 250, 290, 294, 294.7

(56) References Cited

U.S. PATENT DOCUMENTS 5,717,630 A * 2/1998 Koshikawa et al. .... 360/106 X

* cited by examiner

*Primary Examiner*—William R. Korzuch
(74) *Attorney, Agent, or Firm*—W. Daniel Swayze, Jr.; W. James Brady; Frederick J. Telecky, Jr.

(57) ABSTRACT

A read/write head assembly (20) is provided for use in a mass storage device such as a hard disk. drive. The read/write head assembly (20) is positioned on a suspension arm (18) and includes a read/write head (24) and a head lifter (22). The head lifter (22) positions the read/write head (24) in a first position and a second position.

11 Claims, 3 Drawing Sheets

HEAD LIFTER AND METHOD OF OPERATION

This is a continuation of Ser. No. 08/889,124, filed Jul. 7, 1997, now abandoned.

TECHNICAL FIELD OF THE INVENTION

This invention relates in general to the field of mass storage devices, and more particularly to a head lifter and method of operation that may be used in a hard disk drive.

BACKGROUND OF THE INVENTION

Hard disk drives include a stack of magnetically coated platters that are used for storing information. The magnetically coated platters are mounted together in a stacked position through a spindle which may be referred to as a platter stack. The platter stack is typically rotated by a motor that is referred to as a spindle motor or a servo motor. A space is provided between each platter to allow a read/write head or slider to be positioned on each side of each platter so that information may be stored and retrieved. Information is stored on each side of each platter and is generally organized into sectors, tracks, zones, and cylinders.

Each of the read/write heads or sliders are mounted to one end of a dedicated suspension arm so that each of the read/write heads may be positioned as desired. The opposite end of each of the suspension arms are coupled together at a voice coil motor, also referred to as a head actuator, to form one unit or assembly that is positionable by the voice coil motor. Each of the suspension arms are provided in a fixed position relative to each other. The voice coil motor positions all the suspension arms together so that the active read/write head is properly positioned for reading or writing information. The read/write heads or sliders may move from an inner diameter to an outer diameter. This distance may be referred to as a data stroke.

When a hard disk drive is initially powered-up, the read/write heads must transition from a state of resting on the surface of the associated platter to a flying height position above the surface of the associated platter. When fully powered-up, the read/write heads are, in effect, riding on a cushion of air above the surface of the platters. In this state, the read/write heads may be referred to as "flying."

Problems arise when a hard disk drive is initially powered-up. The cumulative friction between each of the plurality of read/write heads and their corresponding platter results in a cumulative friction that must be overcome before starting up the rotation of the platter stack. This may be referred to as a "sticking" problem. For example, many hard disk drives have as many as nine platters with two read/write heads per platter. Oftentimes, the read/write heads are positioned over data during start-up which potentially leads to the problem of damaged or destroyed data because of the friction between the read/write head and the surface of the platter during start-up. Read/write heads are generally provided as ultra-smooth heads such that the read/write heads and the platters almost fuse together after the platters stop spinning. This further increases the "sticking" problem.

Prior attempts at solving this high torque condition at start-up have focused on shaking or rapidly moving the voice coil motor to free the heads from this fused or high 20. torque condition. In some cases, these attempts fail and the platters do not rotate or spin resulting in potential catastrophic damage to the spindle motor. This technique may result in the loss of data due to the shaking of the heads on the surface of the platters. Other attempts at solving this problem have focused on using ramps to position the read/write heads above the platters. This too has proven difficult and cumbersome to implement.

Once the read/write heads transition from being positioned on the surface of the platters to flying above the surface of the platters, a drag torque is created which increases with the rotational speed of the platters. This reduces the platter rotational speed. This is undesirable because hard disk drive data access time is related to the spindle speed. Thus, the drag torque reduces the spindle or platter speed and hence limits the overall hard disk drive-ability to retrieve data quickly.

SUMMARY OF THE INVENTION

From the foregoing it may be appreciated that a need has arisen for a head lifter and method of operation that solves the high torque and "sticking" problem that occurs at start-up and the drag torque problem that occurs when all of the read/write heads are flying and positioned slightly above the surface of the rotating platters. In accordance with the present invention, a head lifter and method of operation that may be used in a hard disk drive are provided which substantially eliminate the disadvantages and problems outlined above.

According to the present invention, a read/write head assembly is provided for use in a mass storage device such as a hard disk drive. The read/write head assembly is located on a suspension arm and includes a read/write head and a head lifter. The head lifter positions the read/write head in a first position and a second position.

The present invention provides numerous technical advantages. One technical advantage of the present invention includes the capability to start-up a mass storage device, such as a hard disk drive, with a lower starting torque by preventing the read/write heads from sticking to the platters. This significantly increases data reliability and reduces the chances for a catastrophic data or system failure. Another technical advantage of the present invention includes reduced drag torque when the read/write heads are positioned above the rotating platters. This allows for increased platter speeds, which is also referred to as increased spindle speeds, which provides the capability to retrieve data faster from hard disk drives and mass storage devices.

Yet another technical advantage of the present invention includes increased spindle speeds while using the same spindle motor power supply. This results in power savings that are especially important in portable applications such as laptop computers and notebook computers. Still yet another technical advantage of the present invention includes the capability to achieve increased spindle speeds at reduced overall costs as compared to other techniques. For example, other techniques to achieve increased spindle speeds focus on such things as expensive and exotic bearings to reduce spindle friction and the use of expensive spindle motor power supplies that operate at higher voltages than standard spindle motor power supplies. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
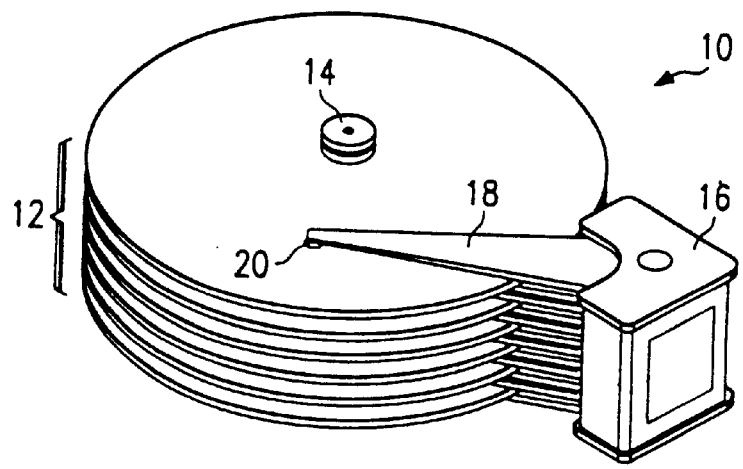
FIG. 1 is a perspective view illustrating an exemplary disk/head assembly that includes a platter stack, a voice coil motor, a spindle motor, and a plurality of suspension arms extending to each side of each platter.

FIG. 1 is a perspective view illustrating an exemplary disk/head assembly 10 that includes a platter stack 12, a voice coil motor 16, and a plurality of suspension arms, such as suspension arm 18, extending to each side of each platter of platter stack 12. A read/write head assembly 20 is positioned on each of the plurality of extension arms. The various platters of platter stack 12 are mounted through a spindle 14 in a concentric manner so that each of the platters may rotate simultaneously using spindle 14. Spindle 14 is rotated through a spindle motor which is generally provided at or near the bottom of platter stack 12 and spindle 14. Each of the platters of platter stack 12 are preferably provided as magnetically coated platters that are mounted in such a manner that a space is provided between each platter so that a suspension arm and a read/write head assembly 20 may extend to each side of each platter.

Voice coil motor 16 is used to position each of the plurality of suspension, arms and their corresponding read/write head assembly. It should be noted that typically all of the plurality of suspension arms and corresponding read/write head assemblies are positioned simultaneously by voice coil motor 16. Voice coil motor 16 provides a rotational force at one end of the plurality of suspension arms so that each of the plurality of suspension arms extends from an outer diameter to an inner diameter on each side of each platter of platter stack 12.

Focusing now on suspension arm 18 and read/write head assembly 20 as an exemplary suspension arm and read/write head assembly, it is noted that read/write head assembly 20 is provided at one end of suspension arm 18. In alternative embodiments, it should be understood that read/write head assembly 20 may be positioned or coupled to suspension arm 18 at any intermediate point between the two ends of suspension arm 18. Suspension arm 18 may also include a routing tube, not shown in FIG. 1, for providing any needed signals to and from read/write head assembly 20. An exemplary routing tube in one embodiment of read/write head assembly 20 is discussed more fully below in relation to FIGS. 5 and 6.

Each of the coupled platters of platter stack 12 are in a stationary position until power is applied. At such time, the platters are rotated and regulated at a desired speed. The platters are rotated by means of a spindle motor that provides rotational motion to spindle 14. After achieving the desired speed, voice coil motor 16, while performing a read, write, or servo operation, positions a designated read/write shead assembly over a desired track and sector so that information may be read from or written to the desired track. The designated read/write head assembly may be referred to as the active read/write head assembly because it is being used for reading or writing information. Generally, all of the plurality of suspension arms are positioned simultaneously.

Figure 2:
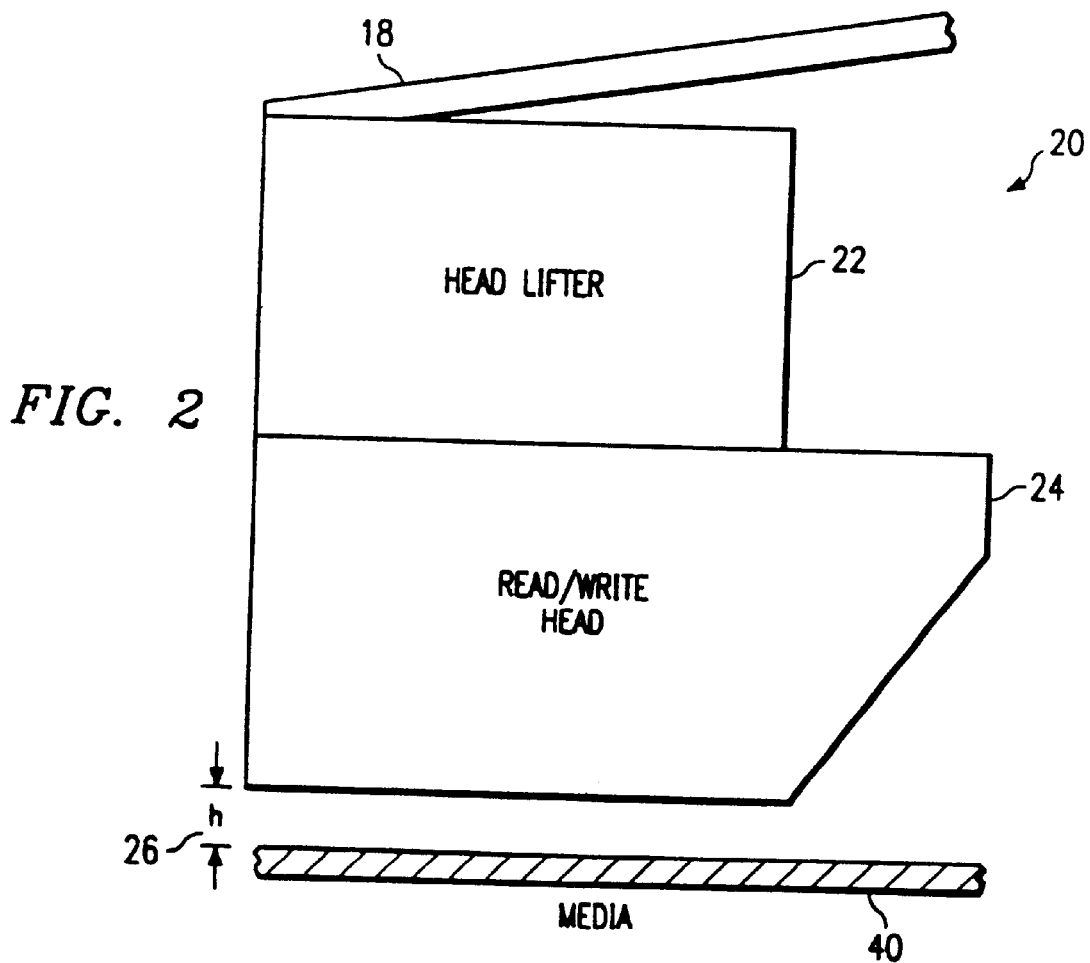
FIG. 2 is a side view illustrating a read/write head assembly provided in a first position over a stationary media.

FIG. 2 is a side view illustrating read/write head assembly 20 provided in a first position over a stationary media 40. Read/write head assembly 20 includes a head lifter 22 and a read/write head 24. Read/write head 24 may also be referred to as a slider. Read/write head assembly 20, in the one embodiment of FIG. 2, is shown positioned at the end of suspension arm 18 as was illustrated in FIG. 1.

Head lifter 22 controls the position of read/write head 24 such that read/write head 24 may be provided in a first position, as shown in FIG. 2, or a second position as discussed more fully below and as illustrated more fully below with respect to FIGS. 4 and 6. In the first position, read/write head 24 is provided at a distance 26, indicated by the letter "h" in FIG. 2, from stationary media 40. In one embodiment, distance 26 may be around eighty microinches. In other embodiments, distance 26 may be any distance from forty microinches to two-hundred microinches, but may be provided in virtually any distance to accomplish the advantages of the present invention as discussed below. Distance 26 eliminates the disadvantages discussed previously with respect to prior arrangements in which the read/write head resides against the media during start-up and creates a cumulative friction between the plurality of read/write heads and the static media. Furthermore, distance 26 significantly decreases the probability of catastrophic data or system failures that may occur when a system is powered-up and the high friction condition must be overcome. Distance 26 also allows media 40 to reach its desired rotational speed more quickly.

Figure 3:
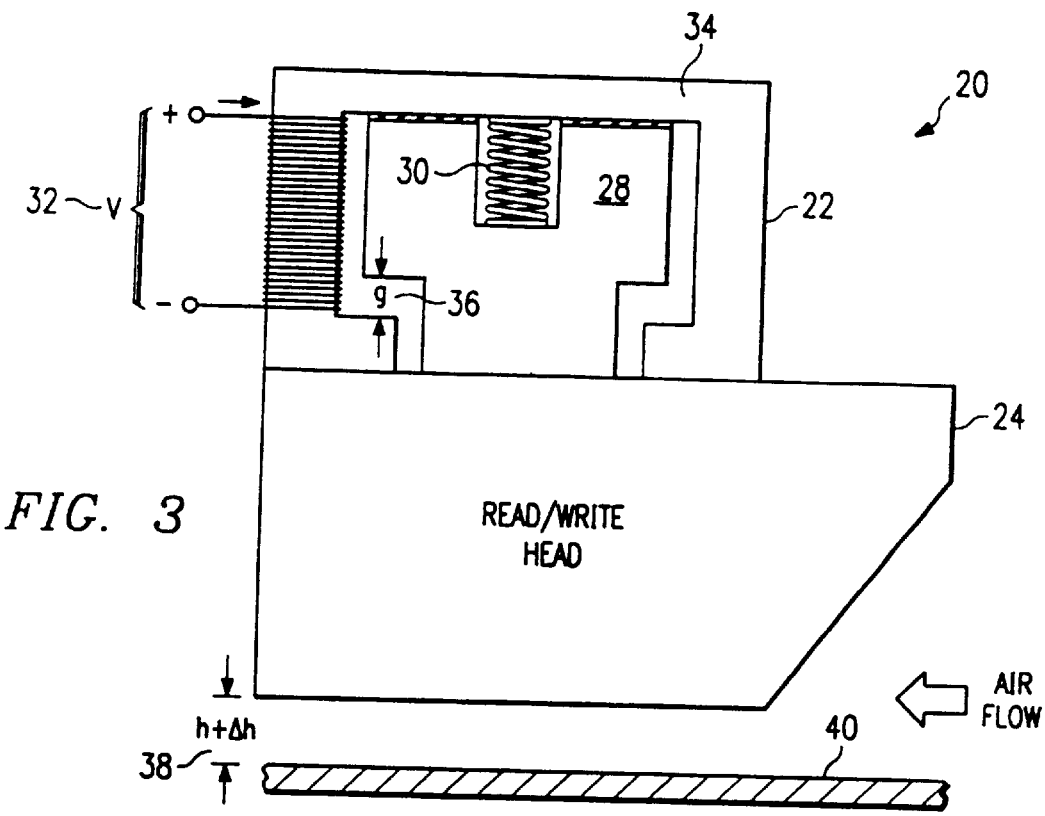
FIG. 3 is a side view of the read/write head assembly illustrating a read/write head positioned in a first position over a rotating media by an electromagnetic head lifter.

FIG. 3 is a side view of one embodiment of read/write head assembly 20 illustrating read/write head 24 positioned in the first position over rotating media 40 by an electromagnetic head lifter 22. The airflow direction created by the rotation at media 40 is shown and results in a drag torque condition which retards the rotational motion of media 40. A distance 38 is illustrated and is denoted with the equation "h+Δh." Distance 38 represents distance 26 of FIG. 2 plus the distance Δh that is provided due to the airflow which provides a lift to read/write, head 24. Distance Δh may be around twenty microinches. In other embodiments, distance Δh may be any distance from five microinches to forty microinches, but may be provided in virtually any distance to accomplish the advantages of the present invention as discussed below.

As mentioned above, head lifter 22, in the embodiment of FIG. 3, is provided as an electromagnetic head lifter 22 that operates like a solenoid. As such, head lifter 22 may position read/write head 24 in a first position as shown or in a downward or second position as shown in FIG. 4. Generally, read/write head 24 will be provided in the first position while head lifter 22 is in a non-energized state. Similarly, head lifter 22 will position read/write head 24 in a second position when head lifter 22 is provided in an energized state. It should be noted that distance 38 provides the advantage of a reduced drag torque when compared to prior systems. This is true because all read/write heads of prior systems reside closer to rotating media 40. The smaller the distance between read/write head 24 and rotating media 40, the greater the drag torque on the spindle.

Figure 4:
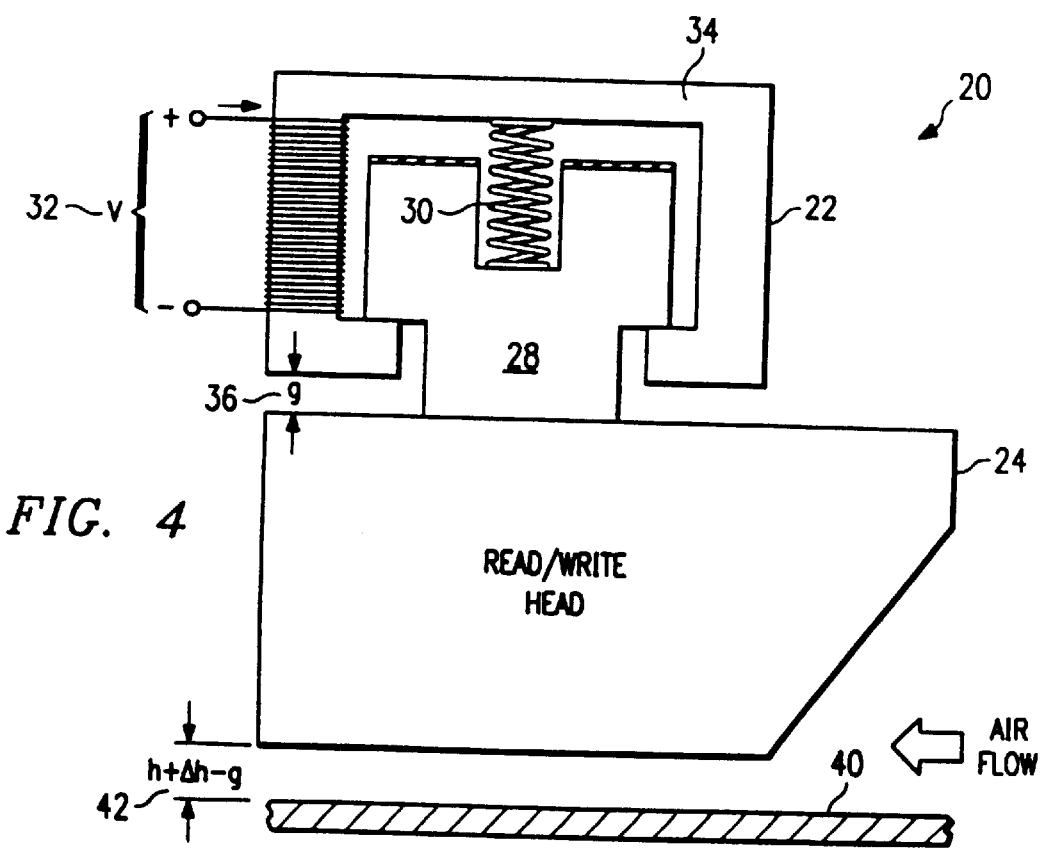
FIG. 4 is a side view of the read/write head assembly of FIG. 3 illustrating the read/write head positioned in a second position over the rotating media by the electromagnetic head lifter.

Head lifter 22, in the embodiment of FIG. 3 and FIG. 4, includes a plunger member 28 that couples to an outer member 34 through a spring 30. Outer member 34 may receive an energizing voltage 32 or related current through a coil that is provided around outer member 34. Outer member 34 and plunger member 28 will preferably be implemented using a material with a high permeability such as iron. Spring 30 is shown mounted between a cavity in plunger member 28 and outer member 34. A distance 36 is also illustrated and is referenced with the letter "g" which represents the distance that plunger member 28 will move when energizing voltage 32 is provided to force plunger member 28 in a downward direction to minimize the reluctance path through outer member 34 and plunger member 28.

Plunger member 28 also includes a small dielectric layer along its top edge. This dielectric layer, in alternative embodiments, may be provided as an air gap or layer that serves to somewhat magnetically isolate plunger member 28 from outer member 34 in this embodiment of head lifter 22. It should also be noted that although outer member 34 and plunger member 28 will preferably be implemented using a material having a high permeability, any of a variety of similar or other materials may be used in the present invention.

Head lifter 22 may be manufactured using any of a variety of known and available techniques that are well known by one of ordinary skill in the art. For example, head lifter 22 will preferably be implemented as a microelectromechanical system (MEMS) which may be also referred to as a micromachined device. As such, head lifter 22 may be implemented using silicon and other suitable materials using semiconductor fabrication techniques. For example, spring 30 may be implemented as a silicon spring using single crystal silicon and the high permeability material can be permalloy plating on silicon.

In operation, head lifter 22 is provided in the non-energized state which results in read/write head 24 being provided in a first position above media 40. Media 40 moves or rotates below read/write head 24 which causes read/write head 24 to "fly" or lift away from is media 40 a distance Δh. Head lifter 22 is provided in the non-energized state because energizing voltage 32 is provided at a zero level or some other level that does not cause plunger member 28 to overcome the force of spring 30 and move downward a distance g. Thus, spring 30 is in a semi-equilibrium state such that spring 30 provides an upward force on plunger member 28.

FIG. 4 is a side view of read/write head assembly 20 of FIG. 3 illustrating read/write head 24 positioned in a second position over media 40 by head lifter 22. In the second position, read/write head 24 is provided at a distance 42, indicated by the equation "h+Δh−g", above media 40. In one embodiment, the distance g of the equation "h+Δh−g" may be around eighty microinches. In other embodiments, the distance g may be any distance from forty microinches to two-hundred microinches, but may be provided in virtually any distance to accomplish the advantages of the present invention as discussed below. Media 40 may be rotating or moving relative to read/write head 24. Once again, head lifter 22 is implemented, in this embodiment, as an electromagnetic head lifter. As is shown, head lifter 22 is provided in an energized state such that distance 36 (or the distance g) of FIG. 3, between plunger member 28 and outer member 34, is minimized and a new distance 36 is provided as shown in FIG. 4. Distance 36 is reflected in FIG. 4 between the bottom of outer member 34 and the top of read/write head 24. Spring 30 is also shown in an extended position such that when energizing voltage 32 is removed, spring 30 will retract plunger member 28 and read/write head 24 to the first position as was previously illustrated in FIG. 3.

Read/write head 24 may be thought of as the designated or active read/write head that is being used to exchange information with media 40. For example, during read operations and write operations, read/write head 24 will need to be positioned more closely to media 40. As such, it is critical that read write head 24 is positioned at distance 42 from media 40. During these times, the drag torque is increased. However, in one embodiment, head lifter 22 will only provide read/write head 24 in the second position during periods in which read/write head 24 is the active or designated read/write head. In this manner, the overall drag torque is minimized because only one or a limited number of read/write heads are provided in the second position at any given time. Even if all the heads, are correspondingly positioned in the second position at the same time, during non-read/write conditions, all of the heads may be provided in the first position. This also results in a reduction in the overall drag torque as compared to other techniques. The reduction in drag torque allows for increased spindle speeds without the addition of expensive bearings or increased power supply voltage which also results in increased power consumption.

Figure 5:
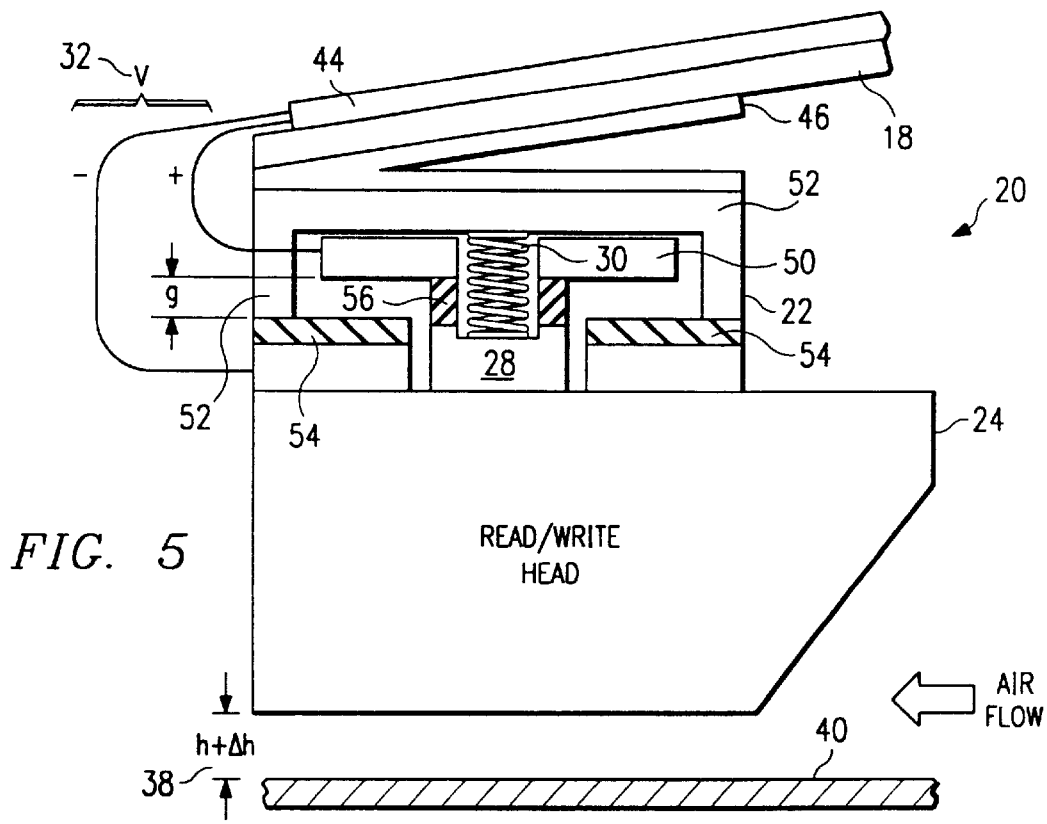
FIG. 5 is a side view of the read/write head assembly positioned on a suspension arm and illustrating the read/write head positioned in a first position over a rotating media by an electrostatic head lifter.

FIG. 5 is a side view of read/write head assembly 20 positioned on suspension arm 18 and illustrating read/write head 24 positioned in a first position over media 40 by head lifter 22. Media 40, will be moving relative to read/write head 24. In this embodiment, head lifter 22 is provided as an electrostatic head lifter. As such, head lifter 22 includes a plunger member 28 attached to an outer member 52 through a spring 30. Read/write head assembly 20 of FIGS. 5 and 6 operate similarly to read/write head assembly 20 of FIGS. 3 and 4 except for the fact that head lifter 22 is provided as an electrostatic head lifter as opposed to an electromagnetic head lifter.

Plunger member 28 of head lifter 22 includes a dielectric portion 56 on both sides of spring 30 to isolate 10 one portion of plunger member 28 from a top portion 50 of plunger member 28. Also, a small space or gap is provided between top portion 50 of plunger member 28 and the inside portion of outer member 52 as illustrated. This space or gap may be provided as a dielectric layer in alternative embodiments and serves to isolate top portion 50 of plunger member 28 from outer member 52.

Outer member 52 of head lifter 22 also includes a dielectric layer portion 54 so that the layer of outer member 52 residing below the dielectric layer portion 54 may serve as a charge plate. Similarly, top portion 50 of plunger member 28 serves as a charge plate. A charge may then be provided to each of these plates through energizing voltage 32. No charge is provided in FIG. 5.

Figure 6:
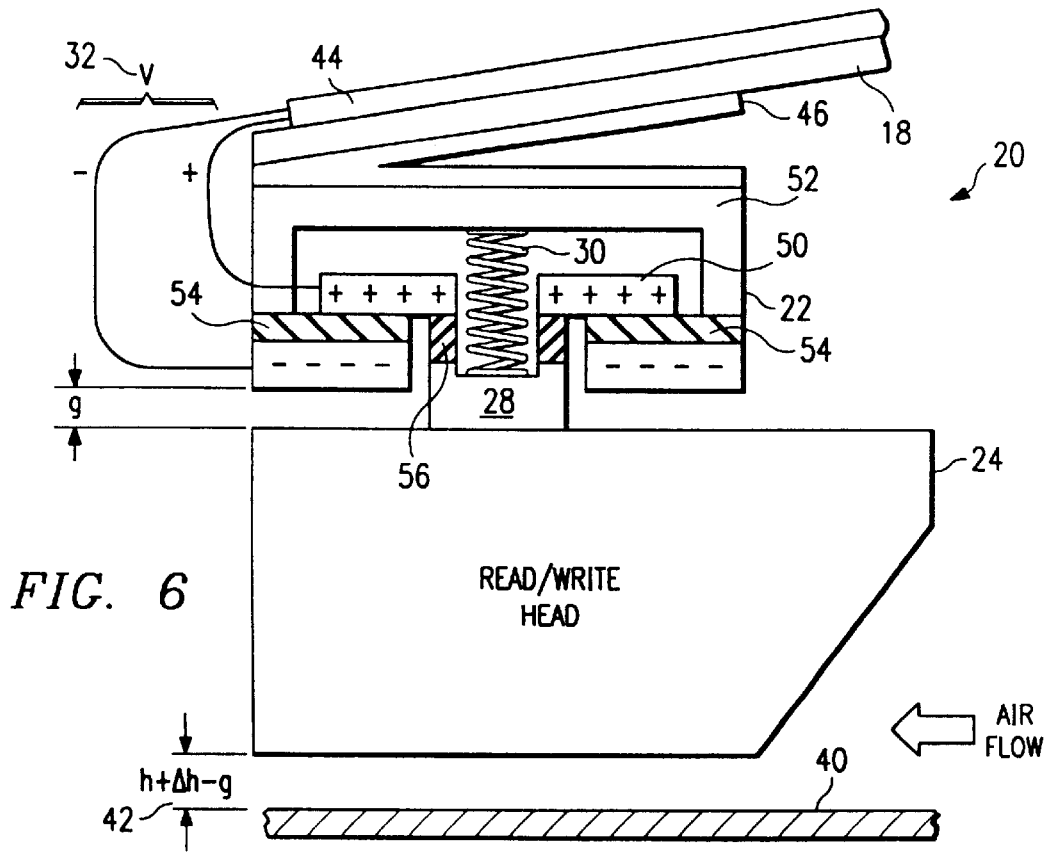
FIG. 6 is a side view of the read/write head assembly of FIG. 5 positioned on the suspension arm and illustrating the read/write head positioned in a second position over the rotating media by the electrostatic head lifter.

FIGS. 5 and 6 also provide one embodiment of how read/write head assembly 20 positions to suspension arm 18. In this embodiment, read/write head assembly 20 is positioned to one end of suspension arm 18 through a gimbal 46. Gimbal 46 provides added stability to read/write head assembly 20 and may be referred to as a flexure. In other embodiments read/write head assembly 20 may be positioned to other portions of suspension arm 18 and may be positioned through some intermediate device, such as gimbal 46. An exemplary routing tube 44 is also shown so that control signals may be provided through routing tube 44 to read/write head assembly 20.

In FIG. 5, media 40 is provided in a rotational motion or linear motion such that distance 38 increases from a distance h to a distance "h+Δh." Distance 38 is similar to distance 38 as shown in FIG. 3 and as discussed above. The direction of the airflow is indicated by the arrow. As a consequence, read/write head 24 is provided in the first position by spring 30 and the air flow.

FIG. 6 is a side view of read/write head assembly 20 of FIG. 5 positioned on suspension arm 18 and illustrating read/write head 24 positioned in a second position over media 40 by head lifter 22. In this embodiment, energizing voltage 32 is provided to the plates of head lifter 22 and an attractive force is generated between the plates of plunger member 28 and outer member 52. In alternative embodiments of head lifter 22, the charge plates may be provided only on one side of spring 30 or on both sides of spring 30 as illustrated in FIG. 6. As a consequence of the attractive force, the gap g illustrated in FIG. 5 is closed so that a new gap g is provided between the bottom of outer member 52 and the top of read/write head 24 as illustrated in FIG. 6. This results in read/write head 24 being provided closer to media 40 so that a read operation, a write operation, or a servo operation may take place. A distance 42 is illustrated with the equation "h+Δh−g" to indicate that read/write head 24 is provided closer to media 40 by a distance g in comparison with distance 38 of FIG. 5. Distance 42 is similar to distance 42 as shown in FIG. 4 and as discussed above. Once energizing voltage 32 is removed, spring 30 retracts plunger member 28 and read/write head 24 so that read/write head 24 is provided in the first position. Alternatively, the same polarity may be provided to each of the plates of head lifter 22 such that a repulsive force is provided between the plates. This will result in read/write head 24 being driven back to the first position by the combination of the repulsive forces and spring 30. Energizing voltage 32 may be referred to as a head lifter control signal.

Thus, it is apparent that there has been provided, in accordance with the present invention, a hard disk drive head lifter and method of operation that satisfy the advantages set forth above. Although the preferred embodiment has been described in detail, it should be understood that various and numerous changes, substitutions, and alterations can be made herein without departing from the scope of the present invention. For example, although the present invention has been described and illustrated with different types of head lifters, other head lifter designs not illustrated may be developed and designed that achieve the same or similar results contemplated by the present invention. Also, the gimbal and suspension arm assembly may be provided in numerous other configurations without departing from the scope of the present invention. Furthermore, the present invention has been primarily illustrated as being used with a hard disk drive. It should be understood that the present invention may be implemented using any of a variety of mass storage devices such as a compact disk drive, an optical storage device, or other types of magnetic storage devices.

The direct connections illustrated herein could be altered by one skilled in the art such that two components or elements are merely coupled to one another through an intermediate device or devices, without being directly connected, while still achieving the desired results demonstrated by the present invention. For example, variations in the placement of the head lifter could be provided such that the gimbal or another device is provided between the head lifter and the read/write head. Other examples of changes, substitutions, and alterations are readily ascertainable by one skilled in the art and could be made without departing from the spirit and scope of the present invention as defined by the following claims.

What is claimed is:

1. A read/write head assembly positioned on a suspension arm, the read/write head assembly comprising:
    a read/write head; and
    an electrostatic head lifter operable to position the read/write head with respect to the suspension arm in a first position and a second position, wherein said head lifter includes a microelectromechanical system to move said read/write head from said first position to said second position and a mechanical system to move said read/write head from said second position to said first position.

2. The read/write head assembly of claim 1, wherein the read/write head assembly is positioned on the suspension arm using a gimbal.

3. The read/write head assembly of claim 1, wherein the read/write head assembly is positioned on the suspension arm using a flexure.

4. The read/write head assembly of claim 1, wherein the head lifter is provided in a nonenergized state when the read/write head is positioned in the first position.

5. The read/write head assembly of claim 1, wherein the head lifter is provided in an energized state when the read/write head is positioned in the second position.

6. The read/write head assembly of claim 1, wherein the head lifter positions the read/write head in the first position above a storage medium when the storage medium is stationary.

7. The read/write head assembly of claim 1, wherein the head lifter positions the read/write head in the second position above a storage medium when the storage medium is moving.

8. The read/write head assembly of claim 1, wherein the read/write head assembly is implemented in a mass storage device.

9. The read/write head assembly of claim 1, wherein the read/write head assembly is implemented in a mass storage device selected from the group consisting of a hard disk drive, a magnetic storage device, a compact disk read-only memory drive, and an optical storage device.

10. A disk/head assembly, for use in a hard disk drive, the disk/head assembly comprising:
    a platter stack having a plurality of magnetic platters mounted concentrically to a spindle;
    a spindle motor operable to rotate the platter stack by rotating the spindle;
    a plurality of read/write head assemblies, each positioned on a suspension arm and each positioned over a surface of a corresponding separate one of the plurality of magnetic platters, each of the plurality of read/write head assemblies including:
        a read/write head, and
        an electrostatic head lifter operable to position the read/write head with respect to the suspension arm in a first position and a second position, wherein said head lifter includes a microelectromechanical system to move said read/write head from said first position to said second position and a mechanical system to move said read/write head from said second position to said first position; and
    a voice coil motor operable to control the position of the plurality of read/write heads over the surfaces of the plurality of magnetic platters.

11. The disk/head assembly of claim 10, wherein one of the plurality of read/write head assemblies will be an active read/write head assembly during a read operation, and wherein the head lifter of the active read/write head assembly is energized so that the read/write head of the active read/write head assembly is positioned in the second position.

* * * * *